United States Patent
Yang (10) Patent No.: US 7,660,136 B2
(45) Date of Patent: Feb. 9, 2010

(54) METHOD AND APPARATUS FOR SYNCHRONOUS RECTIFYING OF SOFT SWITCHING POWER CONVERTERS

(75) Inventor: Ta-Yung Yang, Milpitas, CA (US)

(73) Assignee: System General Corporation, Shin-Dian, Taipei (TW)

( * ) Notice: Subject to any disclaimer, the term of this patent is extended or adjusted under 35 U.S.C. 154(b) by 176 days.

(21) Appl. No.: 11/869,143

(22) Filed: Oct. 9, 2007

(65) Prior Publication Data

US 2009/0091960 A1 Apr. 9, 2009

(51) Int. Cl.
*H02M 7/217* (2006.01)

(52) U.S. Cl. .................. 363/21.06; 363/53; 363/89; 363/90; 363/127

(58) Field of Classification Search .............. 363/21.06, 363/21.14, 53, 89, 90, 127
See application file for complete search history.

(56) References Cited

U.S. PATENT DOCUMENTS

| | | | | |
|---|---|---|---|---|
| 7,224,590 B2* | 5/2007 | Lin | .................. | 363/21.06 |
| 7,385,832 B2* | 6/2008 | Allinder | .................. | 363/21.14 |
| 7,480,158 B2* | 1/2009 | Moromizato et al. | ...... | 363/21.06 |
| 7,499,294 B2* | 3/2009 | Lin et al. | .................. | 363/21.06 |
| 2005/0047177 A1* | 3/2005 | Tobita | .................... | 363/21.06 |

* cited by examiner

*Primary Examiner*—Shawn Riley
(74) *Attorney, Agent, or Firm*—Thomas, Kayden, Horstemeyer & Risley (57) ABSTRACT

An apparatus for synchronous rectifying of a soft switching power converter is provided. An integrated synchronous rectifier includes a power transistor coupled between a transformer and the output of the soft switching power converter, and a controller receiving a pulse signal to switch on/off the power transistor. A switching control circuit generates the pulse signal in response to a current signal, and generates drive signals to switch the transformer in response to a switching signal. An isolation device is coupled to transfer the pulse signal between the switching control circuit and the integrated synchronous rectifier. The switching signal is used for regulating the power converter and the current signal is correlated to the switching current of the transformer.

15 Claims, 13 Drawing Sheets

METHOD AND APPARATUS FOR SYNCHRONOUS RECTIFYING OF SOFT SWITCHING POWER CONVERTERS

BACKGROUND OF THE INVENTION

1. Field of the Invention

The invention relates to a power converter, and more particularly to a method and apparatus for synchronous rectifying of soft switching power converters.

2. Description of the Related Art

Figure 1:
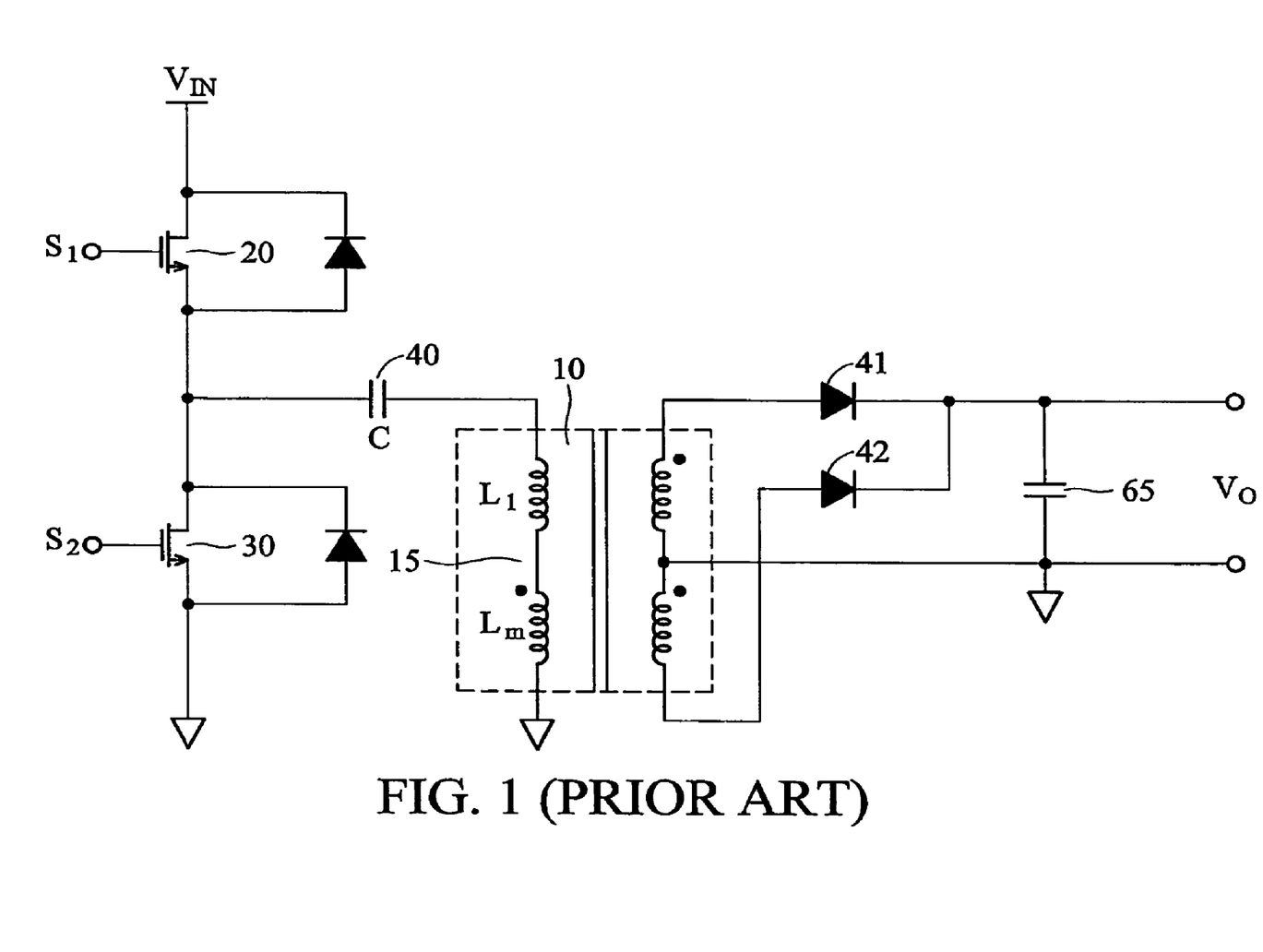
FIG. 1 shows a circuit schematic of a soft switching power converter.

FIG. 1 shows a circuit schematic of a soft switching power converter. It includes a transformer 10 to provide isolation from AC line input to the output of the power converter for safety. The soft switching of the power converter achieves high efficiency and low EMI (electric-magnetic interference) performance. Transistors 20 and 30 develop a half bridge circuit to switch a resonant tank and the transformer 10. The resonant tank is formed by an inductor 15 and a capacitor 40. The inductor 15 acts as a primary-side leakage inductance of the transformer 10 and/or an inductance device. The inductance L of the inductor 15 and the capacitance C of the capacitor 40 determine the resonance frequency $f_0$.

$$f_0 = \frac{1}{2\pi\sqrt{L \times C}} \quad (1)$$

The transformer 10 transfers the energy from the primary side to the secondary side of the transformer 10. Rectifiers 41 and 42 rectify the switching voltage of the transformer 10 into a capacitor 65. A DC voltage $V_O$ is thus generated at the output terminal of the power converter.

The synchronous rectifier on the secondary side of the transformer is a further approach to achieve a higher efficiency power conversion, such as "Control circuit associated with saturable inductor operated as synchronous rectifier forward power converter" by Yang, U.S. Pat. No. 7,173,835. However, the disadvantage of this prior art is an additional power consumptions caused by saturable inductors, etc. The object of present invention is to provide a method and apparatus for the synchronous rectifying of soft switching power converter to achieve higher efficiency.

BRIEF SUMMARY OF THE INVENTION

Methods and apparatus for synchronous rectifying of soft switching power converter are provided. An exemplary embodiment of the methods and the apparatus includes a switching control circuit for generating drive signals in response to the rising edge and the falling edge of a switching signal. Drive signals are coupled to switch a transformer for regulating the power converter. A propagation delay is developed between drive signals to achieve the soft switching of the power converter. The switching control circuit further generates a pulse signal in response to a current signal. A current sense device is coupled to the transformer to generate the current signal in accordance with the switching current of the transformer. The pulse signal is therefore produced in response to the zero-crossings of the switching current. An isolation device, such as a pulse transformer or capacitors, is coupled to the switching control circuit to transfer the pulse signal from the primary side of the transformer to the secondary side of the transformer. An integrated synchronous rectifier includes a power transistor and a controller. The power transistor is connected between the transformer and the output of the power converter for the rectifying. The pulse signal is coupled to set or reset a latch circuit of the controller for turning on/off the power transistor. The pulse signal is a differential signal. The polarity of the pulse signal determines the on/off status of integrated synchronous rectifier.

A detailed description is given in the following embodiments with reference to the accompanying drawings.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
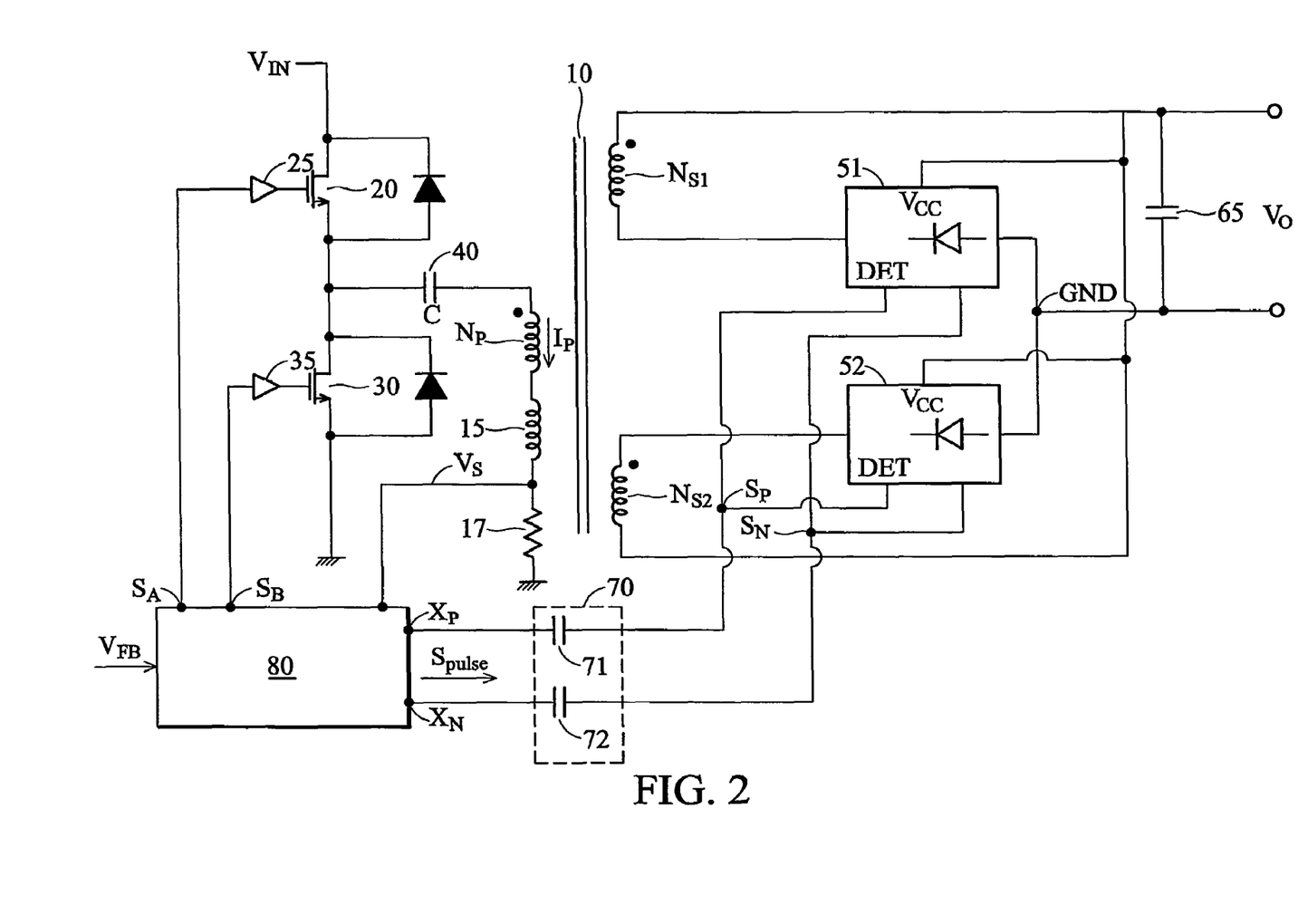
FIG. 2 shows a preferred embodiment of a soft switching power converter having integrated synchronous rectifiers according to the present invention.

FIG. 2 shows a soft switching power converter with integrated synchronous rectifier (synchronous rectifying circuit). The power converter includes a transformer 10 having a primary side and a secondary side. The primary side of the transformer 10 comprises two power switches 20 and 30 for switching the primary winding $N_P$ of the transformer 10. The secondary side of the transformer 10 includes a secondary winding $N_{S1}$ and another secondary winding $N_{S2}$. A first integrated synchronous rectifier 51 comprises a cathode terminal DET connected to the secondary winding $N_{S1}$. An anode terminal GND of the first integrated synchronous rectifier 51 is connected to the output ground of the power converter. A second integrated synchronous rectifier 52 having the cathode terminal DET and the anode terminal GND is also connected from the secondary winding $N_{S2}$ to the output ground of the power converter. A first input-signal terminal $S_P$, a second input-signal terminal $S_N$ of the first integrated synchronous rectifier 51 and the second integrated synchronous rectifier 52 are connected to the secondary side of an isolation device 70 to receive a pulse signal $S_{pulse}$ for turning on or turning off the integrated synchronous rectifiers 51 and 52. The isolation device 70 acts as an isolation barrier, can be composed of capacitors 71 and 72, or can be a pulse transformer. The capacitance of capacitors 71 and 72 can be small, such as 20 pF, but high-voltage rating of capacitors is required for the isolation.

A switching control circuit 80 is coupled to receive a feedback signal $V_{FB}$ in accordance with the output load of the power converter. The drive signals $S_A$ and $S_B$ are coupled to control power switches 20 and 30 through drive circuits 25 and 35 respectively, for switching the transformer 10. A delay time $T_D$ is developed between drive signals for achieving the soft switching of the power converter. Note that the detailed description of the switching signal and the delay time $T_D$ is provided later, and only briefly described herein.

The pulse signal $S_{pulse}$ is generated in response to a current signal $V_S$. The current signal $V_S$ is connected to the switching control circuit 80 and correlated to a switching current $I_P$ of the transformer 10. A current sense device 17 is coupled to the transformer 10 to generate the current signal $V_S$. The pulse signal $S_{pulse}$ is produced on a first output-signal terminal $X_P$ and a second output-signal terminal $X_N$ in response to the zero-crossings of the switching current $I_P$. The pulse signal $S_{pulse}$ is a differential signal. The polarity of the pulse signal $S_{pulse}$ determines turning on or turning off of the integrated synchronous rectifiers 51 and 52.

The first output-signal terminal $X_P$ and the second output-signal terminal $X_N$ of the switching control circuit 80 are coupled to the isolation device 70 to transfer the pulse signal $S_{pulse}$ from the primary side of the transformer 10 to the secondary side of the transformer 10. The pulse width of the pulse signal $S_{pulse}$ is shorter than the pulse width of the switching signal $S_{IN}$. The pulse signal $S_{pulse}$ is a trig signal that includes high frequency elements. Therefore, only small capacitors or a small pulse transformer is required for the isolation device 70, which save the space of the printed circuit board (PCB) and save the cost of the power converter.

Figure 3:
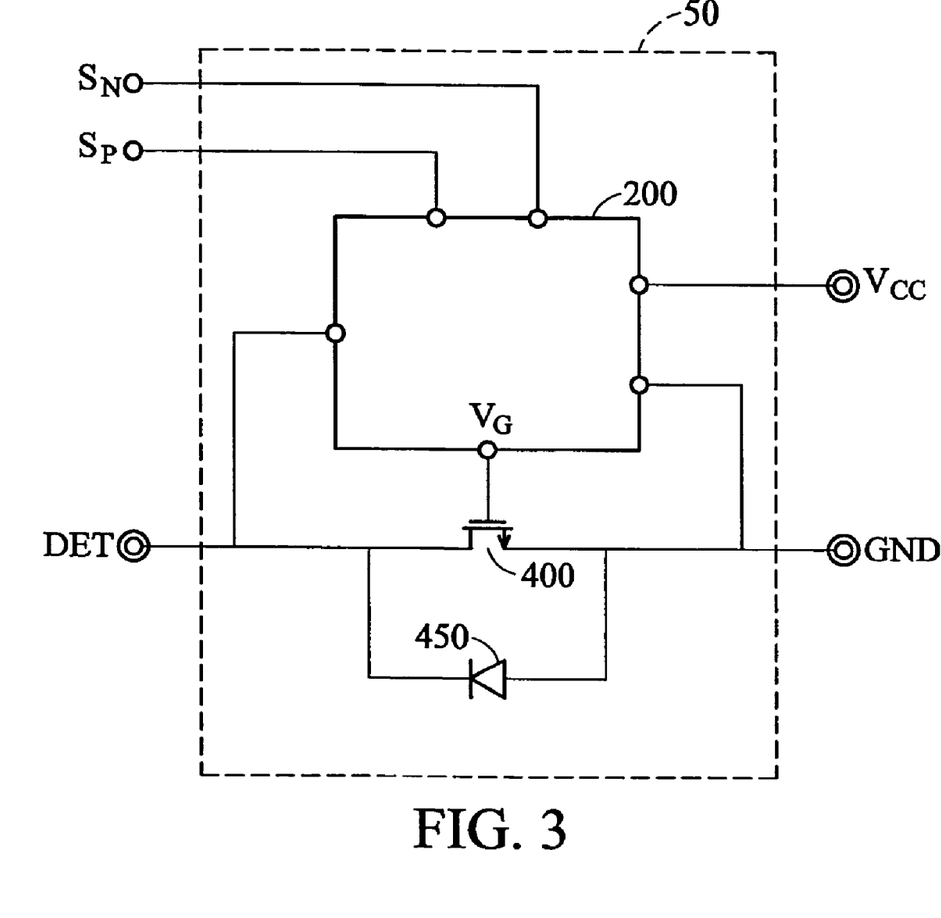
FIG. 3 is a schematic diagram of an integrated synchronous rectifier according to an embodiment of the present invention.

FIG. 3 is a schematic diagram of a preferred embodiment of an integrated synchronous rectifier (synchronous rectifying circuit) 50. It represents the circuit of integrated synchronous rectifiers 51 or 52. The integrated synchronous rectifier 50 includes a power transistor 400, a diode 450 and a controller 200. The diode 450 is connected to the power transistor 400 in parallel. The power transistor 400 is connected between the cathode terminal DET and the anode terminal GND. The cathode terminal DET is coupled to the secondary side of the transformer 10 shown in FIG. 2. The anode terminal GND is normally coupled to the output of the power converter. The controller 200 is coupled to receive the pulse signal $S_{pulse}$ via the first input-signal terminal $S_P$ and the second input-signal terminal $S_N$ for turning on or turning off the power transistor 400. A $V_{CC}$ terminal is utilized to supply the power source to the controller 200.

Figure 4:
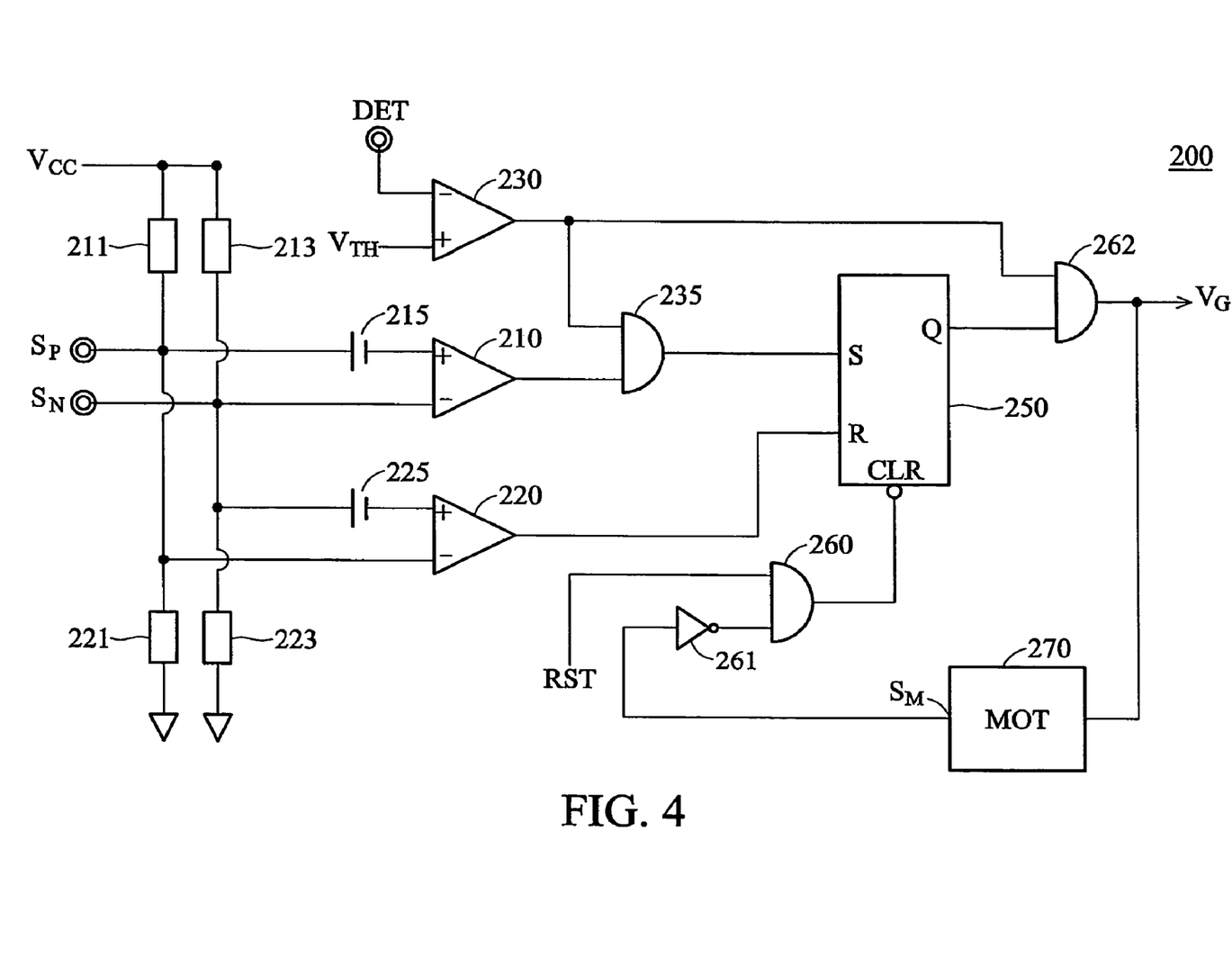
FIG. 4 is an embodiment of a controller of the integrated synchronous rectifier according to the present invention.

FIG. 4 shows a schematic diagram of a preferred embodiment of the controller 200. Resistors 211 and 221 provide a bias termination for the first input-signal terminal $S_P$. Resistors 213 and 223 provide another bias termination for the second input-signal terminal $S_N$. The first input-signal terminal $S_P$ is coupled to the positive input of a comparator 210 and the negative input of a comparator 220. The second input-signal terminal $S_N$ is coupled to the positive input of a comparator 220 and the negative input of a comparator 210. Comparators 210 and 220 comprise offset voltages 215 and 225 respectively, which produces hysteresis. A third comparator 230 having a threshold $V_{TH}$ connects to its positive input. The negative input of the comparator 230 is coupled to the cathode terminal DET. The outputs of comparators 210 and 230 are coupled to the set-input terminal ("S") of a SR flip-flop 250 through an AND gate 235. The reset-input terminal ("R") of the SR flip-flop 250 is controlled by the output of the comparator 220. The output of the SR flip-flop 250 and the output of the comparator 230 are connected to an AND gate 262. A gate-drive signal $V_G$ is generated at the output of the AND gate 262 for controlling the being turned on or being turned off status of the power transistor 400. The maximum on time of the gate-drive signal $V_G$ is limited by a maximum-on-time circuit (MOT) 270. The gate-drive signal $V_G$ is connected to the maximum-on-time circuit 270. After a blanking time, a maximum-on-time signal $S_M$ will be produced in response to the enabling of the gate-drive signal $V_G$. The maximum-on-time signal $S_M$ is connected to an AND gate 260 via an inverter 261. Another input of the AND gate 260 is connected to a power-on reset signal RST. The output of the AND gate 260 is coupled to the clear terminal ("CLR") of the SR flip-flop 250 to clear (reset) the SR flip-flop 250. The maximum on time of the gate-drive signal $V_G$ is thus limited by the blanking time of the maximum-on-time circuit 270. The gate-drive signal $V_G$ will turn off the power transistor 400 once the pulse signal $S_{pulse}$ is generated as, $$V_{SN} - V_{SP} > V_{225} \qquad (2)$$

The gate-drive signal $V_G$ will turn on the power transistor 400 when equations (2) and (3) are met, $$V_{SP} - V_{SN} > V_{215} \qquad (3)$$

$$V_{DET} < V_{TH} \qquad (4)$$

where $V_{SP}$ is the voltage of the first input-signal terminal $S_P$; $VS_N$ is the voltage of the second input-signal terminal $S_N$; $V_{DET}$ is the voltage of the cathode terminal DET; $V_{TH}$ is the voltage of the threshold $V_{TH}$; $V_{215}$ is the value of the offset voltage 215; and $V_{225}$ is the value of the offset voltage 225.

The voltage of the cathode terminal DET will be lower than the voltage of the threshold $V_{TH}$ once the diode 450 is conducted. It shows the power transistor 400 can only be turned on after the diode is turned on.

Figure 5:
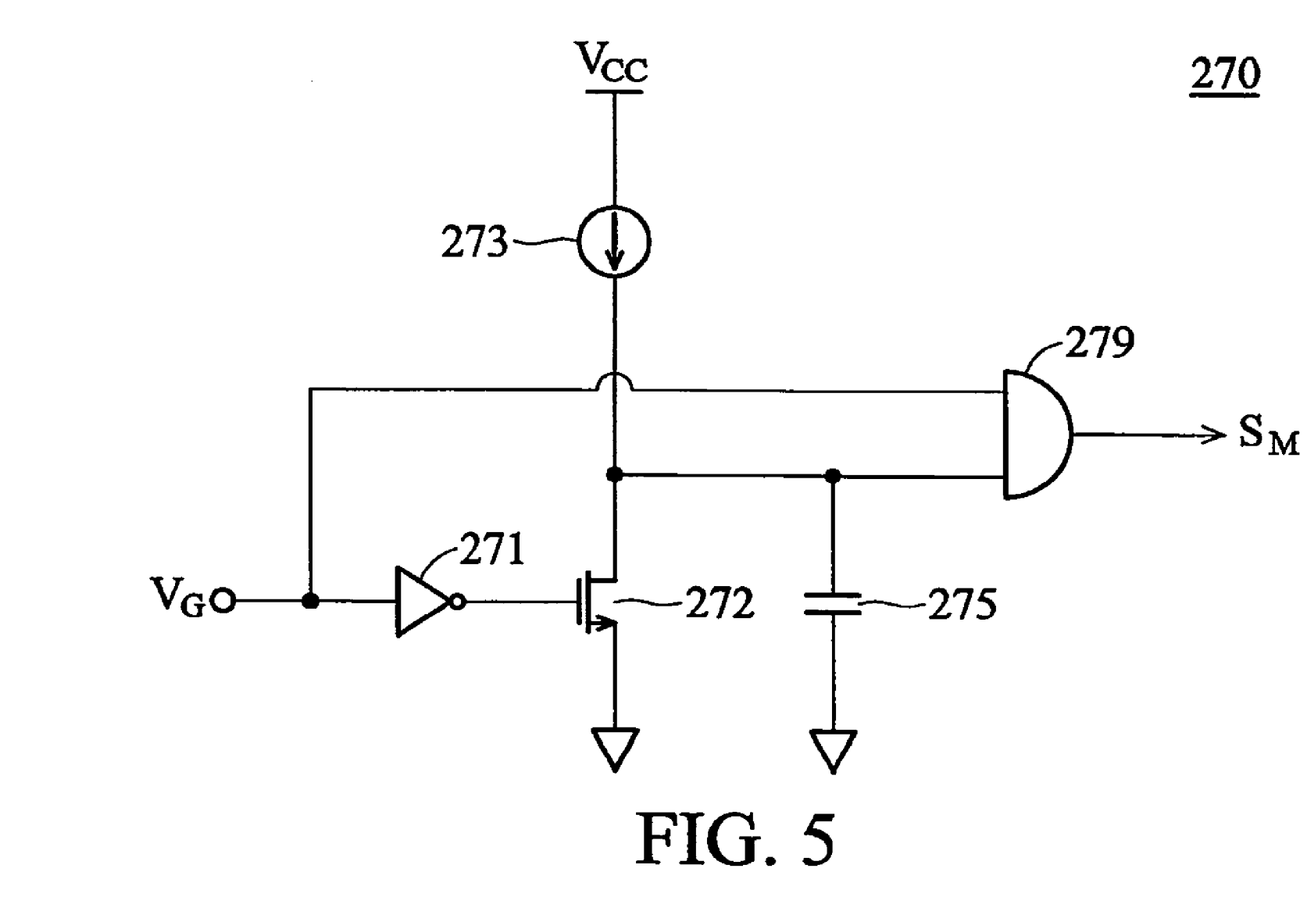
FIG. 5 is a maximum-on-time (MOT) circuit according to an embodiment of the present invention.

FIG. 5 is a schematic diagram of a preferred embodiment of the maximum-on-time circuit (MOT) 270. A current source 273 is connected to charge a capacitor 275. A transistor 272 is connected to discharge the capacitor 275. The gate-drive signal $V_G$ is coupled to control the transistor 272 through an inverter 271. The gate-drive signal $V_G$ is further connected to an AND gate 279. Another input of the AND gate 279 is coupled to the capacitor 275. Once the gate-drive signal $V_G$ is enabled, the output of the AND gate 279 will generate the maximum-on-time signal $S_M$ to disable the gate-drive signal $V_G$ after the blanking time. The blanking time is determined by the current of the current source 273 and the capacitance of the capacitor 275.

Figure 6:
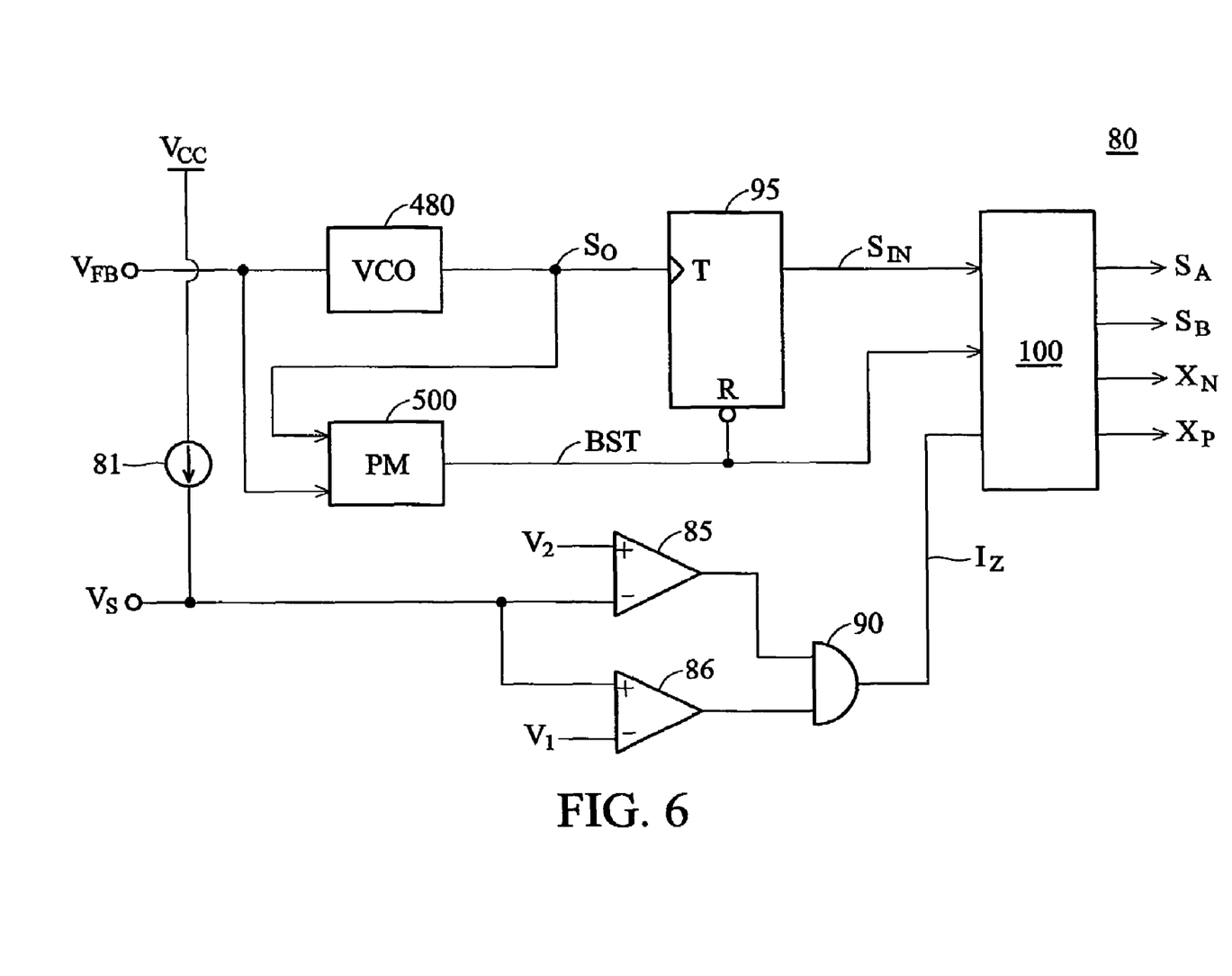
FIG. 6 is a block schematic of a switching control circuit according to an embodiment of the present invention.

FIG. 6 is a schematic diagram of a preferred embodiment of the switching control circuit 80. The switching control circuit 80 is coupled to receive a feedback signal $V_{FB}$ (shown in FIG. 2) for generating a switching signal $S_{IN}$. A signal generator 100 generates drive signals $S_A$ and $S_B$ in response to the rising (leading) edge and the falling (trailing) edge of the switching signal $S_{IN}$. The switching signal $S_{IN}$ is generated by a T flip-flop (divided-by-two circuit) 95, which ensures a 50% duty cycle of the switching signal $S_{IN}$. The input of the T flip-flop 95 is an oscillation signal $S_O$ generated by a VCO (voltage-controlled oscillator) circuit 480. The feedback signal $V_{FB}$ is coupled to control the VCO circuit 480. The frequency of the oscillation signal $S_O$ is thus determined by the feedback signal $V_{FB}$. A power management circuit 500 is developed to generate a burst signal BST in response to the feedback signal $V_{FB}$. The burst signal BST is coupled to the signal generator 100 for generating the pulse signal to switch off the integrated synchronous rectifiers 51 and 52 (the power transistor 400 of the synchronous rectifier). Furthermore, the burst signal BST is connected to reset the T flip-flop 95 and disable the switching signal $S_{IN}$.

A current source 81 provides a DC bias for the current signal $V_S$. The current signal $V_S$ is connected to the negative input of a comparator 85 and the positive input of a comparator 86. The positive input of the comparator 85 is connected to a threshold signal $V_2$. The negative input of the comparator 86 is connected to a threshold signal $V_1$. The voltage signal $V_2$ is higher than the voltage signal $V_1$. The outputs of comparators 85 and 86 are coupled to an AND gate 90. The AND gate 90 generates a zero-crossing signal $I_Z$ coupled to the signal generator 100 for producing the pulse signal on the first output-signal terminal $X_P$ and the second output-signal terminal $X_N$. The crossing signal $I_Z$ is generated in response to the zero-crossings of the switching current $I_P$.

Figure 7:
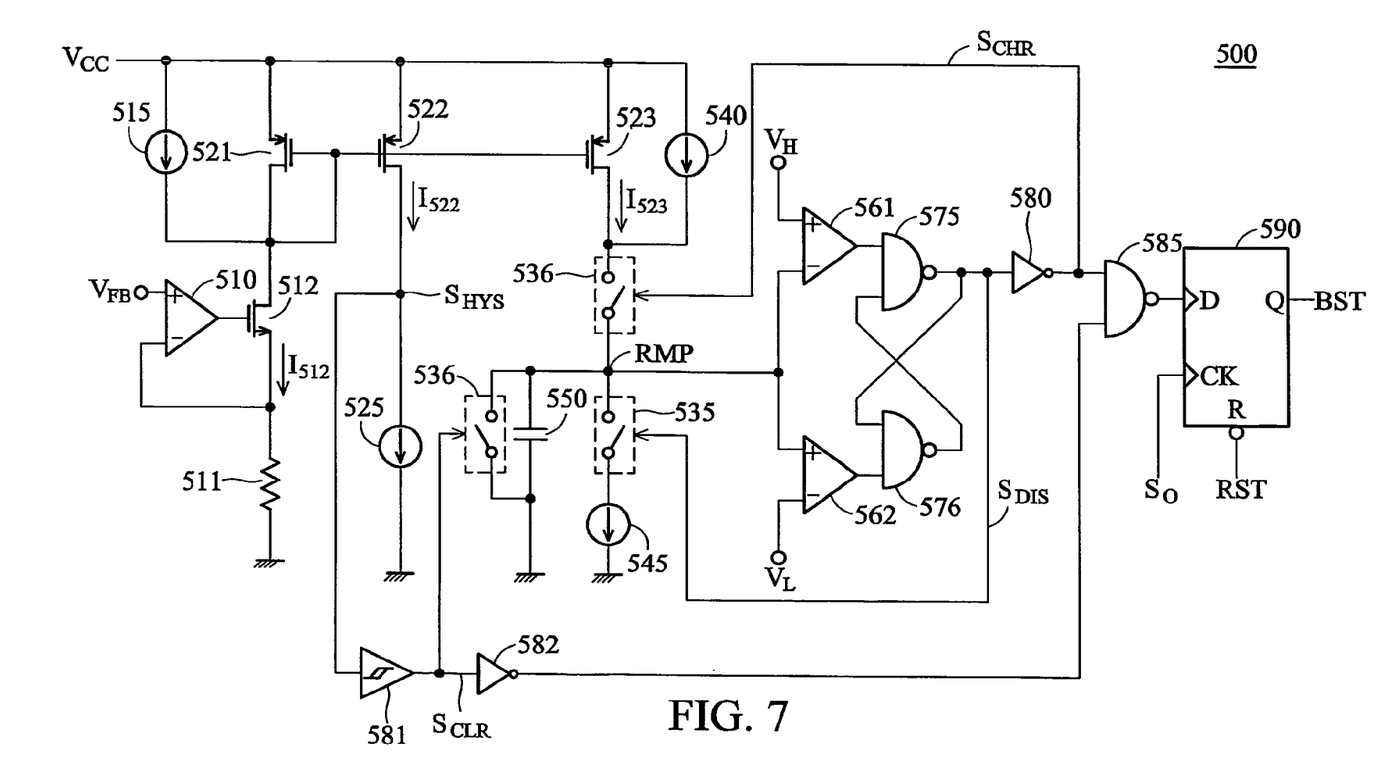
FIG. 7 is a power management circuit according to an embodiment of the present invention.

FIG. 7 shows the circuit schematic of the power management circuit 500. An operational amplifier 510, a resistor 511 and a transistor 512 develop a voltage-to-current converter to generate a current $I_{512}$ at the transistor 512 in accordance with the feedback signal $V_{FB}$. Transistors 521, 522 and 523 form a current mirror. The current $I_{512}$ is coupled to compare with the current of a current source 515 and generate a current $I_{522}$ and $I_{523}$ at the transistor 522 and 523 respectively. The current $I_{522}$ is coupled to compare with the current of a current source 525 and generate a signal $S_{HYS}$ connected to a hysteresis buffer 581. The current $I_{523}$ and a current source 540 are coupled to charge a capacitor 550 through a switch 530. A current source 545 is coupled to discharge the capacitor 550 via a switch 535. The hysteresis buffer 581 generates a clear signal $S_{CLR}$ coupled to control a switch 536 for resetting the capacitor 550. The capacitor 550 is connected to comparators 561 and 562. NAND gates 575 and 576 form a SR latch coupled to the output of comparators 561 and 562 for generating a discharge signal $S_{DIS}$. The discharge signal $S_{DIS}$ is used for controlling the switch 535. A charge signal $S_{CHR}$ is generated in response to the discharge signal via an inverter 580. The charge signal $S_{CHR}$ is connected to control the switch 530. Therefore, a ramp signal RMP is thus generated at the capacitor 550. The charge signal $S_{CHR}$ is further connected to an NAND gate 585. Another input of the NAND gate 585 is coupled to the clear signal through an inverter 582. The output of the NAND gate 585 is connected to the D-input of a flip-flop 590. The oscillation signal $S_O$ is connected to clock the flip-flop 590 for the synchronization. The power-on reset signal RST is coupled to reset the flip-flop 590. The flip-flop 590 therefore produces the burst signal BST correlated to the feedback signal $V_{FB}$.

Figure 8:
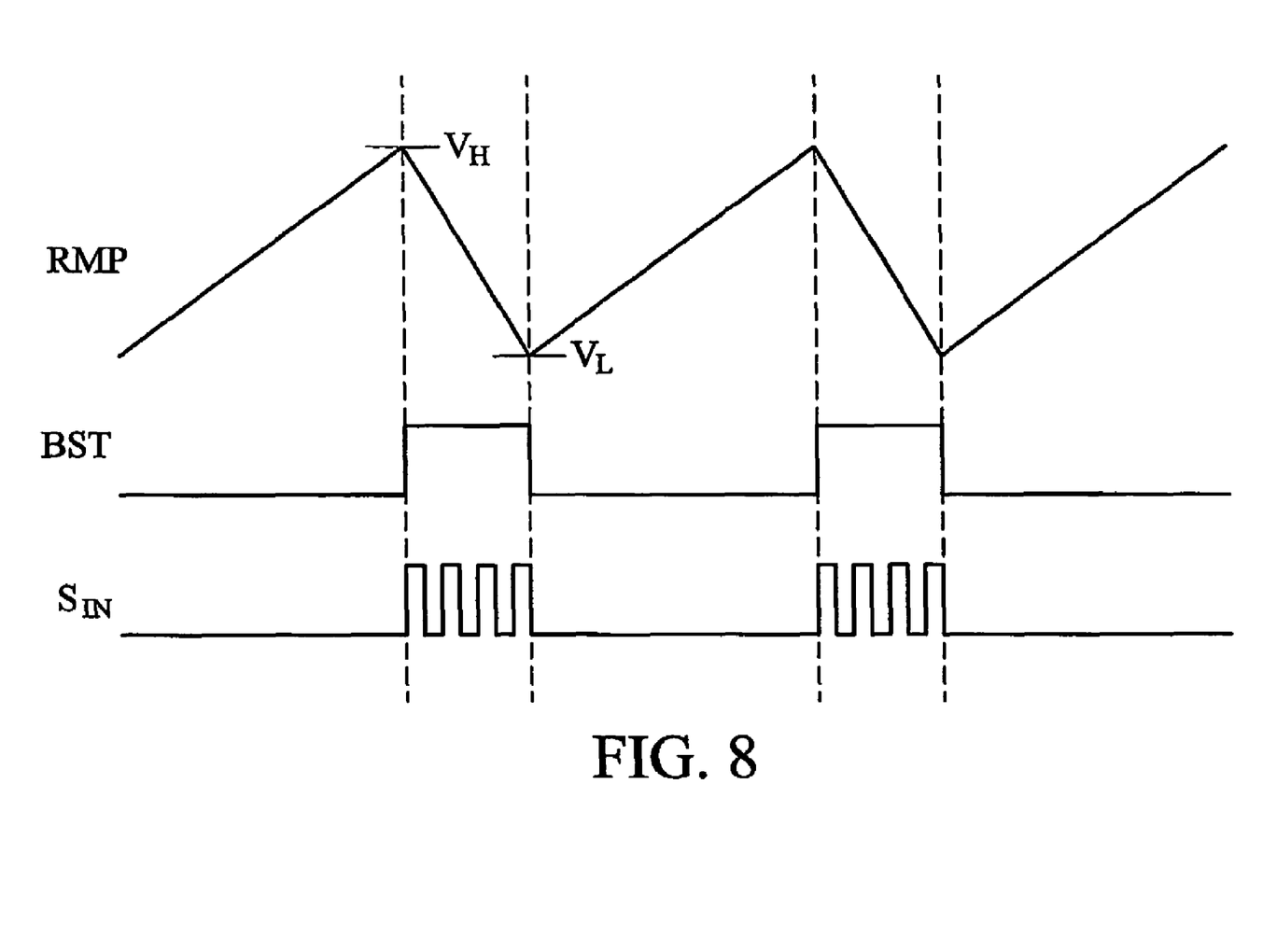
FIG. 8 shows signal waveforms of the power management circuit.

FIG. 8 shows signal waveforms the burst signal. The charge time of the ramp signal RMP and the burst period of the burst signal BST is increased in response to the decrease of the feedback signal $V_{FB}$. The feedback signal $V_{FB}$ is decreased in response to the decrease of the load of the power converter.

Figure 9:
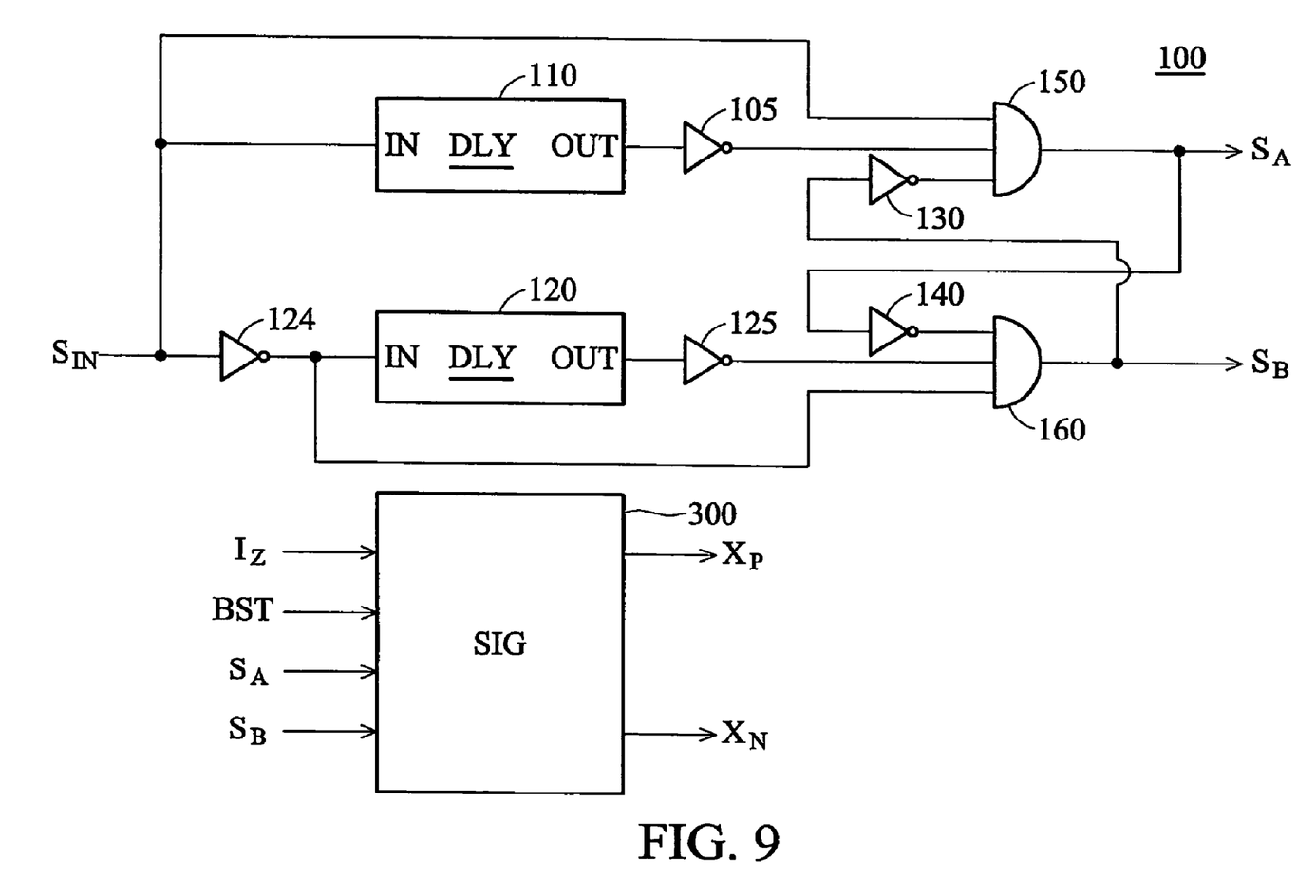
FIG. 9 is the circuit schematic of a signal generator according to an embodiment of the present invention.

FIG. 9 shows the circuit of the signal generator 100. The drive signals $S_A$ and $S_B$ are generated in response to the switching signal $S_{IN}$. The switching signal $S_{IN}$ is connected to the input of a delay circuit 110. The output of the delay circuit 110 is connected to the input of an AND gate 150 through an inverter 105. Another input of the AND gate 150 is coupled to the switching signal $S_{IN}$. AND gates 150, 160 and inverters 130 and 140 develop an anti-cross-conduction circuit to generate the drive signals $S_A$ and $S_B$. The output of the AND gate 150 is coupled to the input of anti-cross-conduction circuit. The switching signal $S_{IN}$ is further connected to the input of a delay circuit 120 through an inverter 124. The output of the delay circuit 120 is connected to the input of the AND gate 160 through an inverter 125. Another input of the AND gate 160 is coupled to the output of the inverter 124. The output of the AND gate 160 is coupled to the input of anti-cross-conduction circuit. A time delay is developed between the enabling of the switching signal $S_{IN}$ and the enabling of the drive signals $S_A$ and $S_B$. The delay circuits 110 and 120 determine the time delay. Furthermore, the burst signal BST, the zero-crossing signal $I_Z$ and drive signals $S_A$, $S_B$ are coupled to a pulse-signal generator 300 to generate the pulse signal on the first output terminal $X_P$ and the second output terminal $X_N$.

Figure 10:
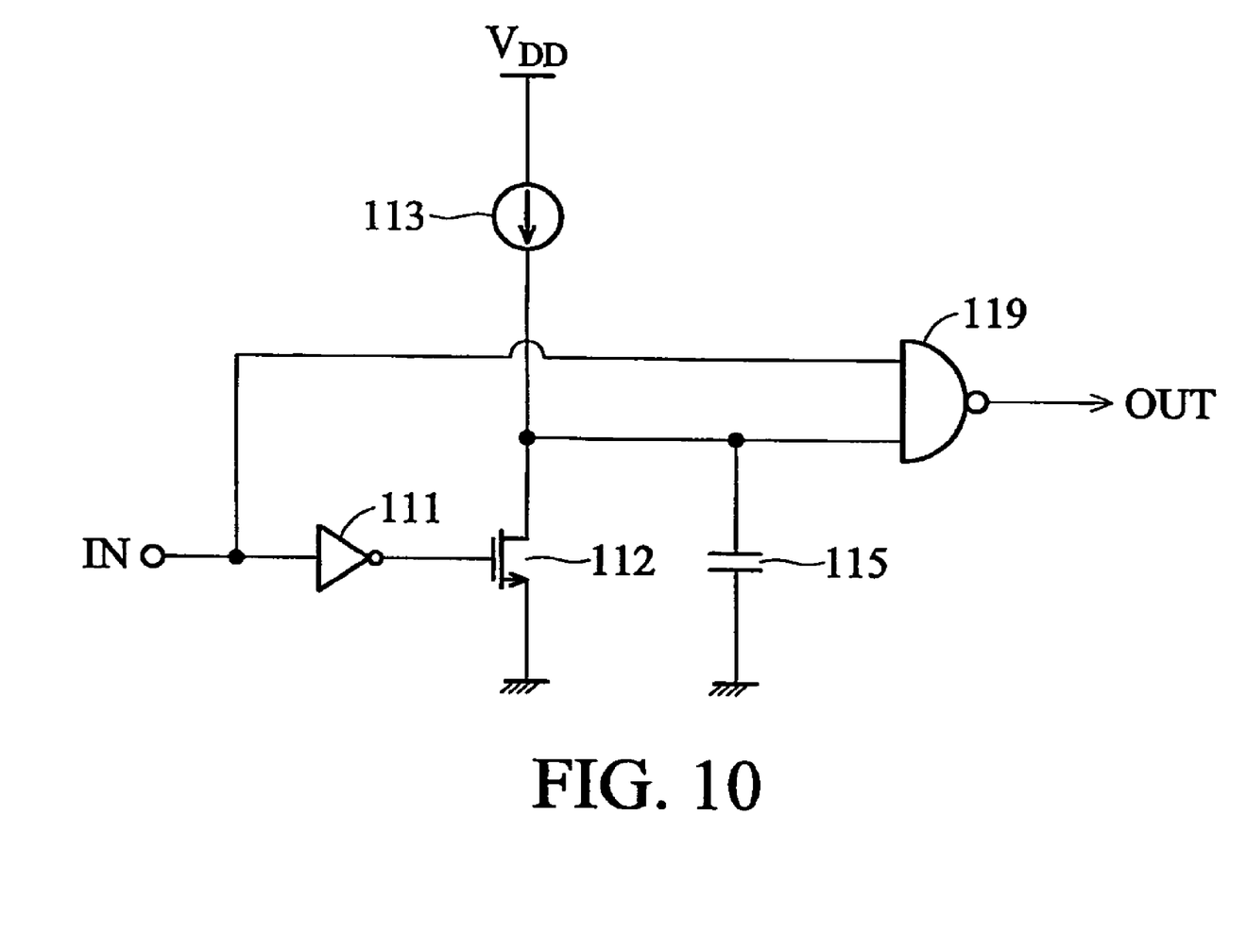
FIG. 10 shows a circuit schematic of a delay circuit.

FIG. 10 shows a schematic diagram of a preferred embodiment of the delay circuit. A current source 113 is connected to charge a capacitor 115. A transistor 112 is connected to discharge the capacitor 115. The input signal is coupled to control the transistor 112 through an inverter 111. The input signal is further connected to an NAND gate 119. Another input of the NAND gate 119 is coupled to the capacitor 115. The output of the NAND gate 119 is the output of the delay circuit. When the input signal is a logic-low, the capacitor is discharged and the output of the NAND gate 119 is the logic-high. When the input signal is changed to the logic-high, the current source 113 will start to charge the capacitor 115. The NAND gate 119 will output a logic-low once the voltage of the capacitor 115 is higher than the input threshold of the NAND gate 119. The current of the current source 113 and the capacitance of the capacitor 115 determine the delay time of the delay circuit. The delay time is started from the logic-high of the input signal to the logic-low of the output signal of the delay circuit.

Figure 11:
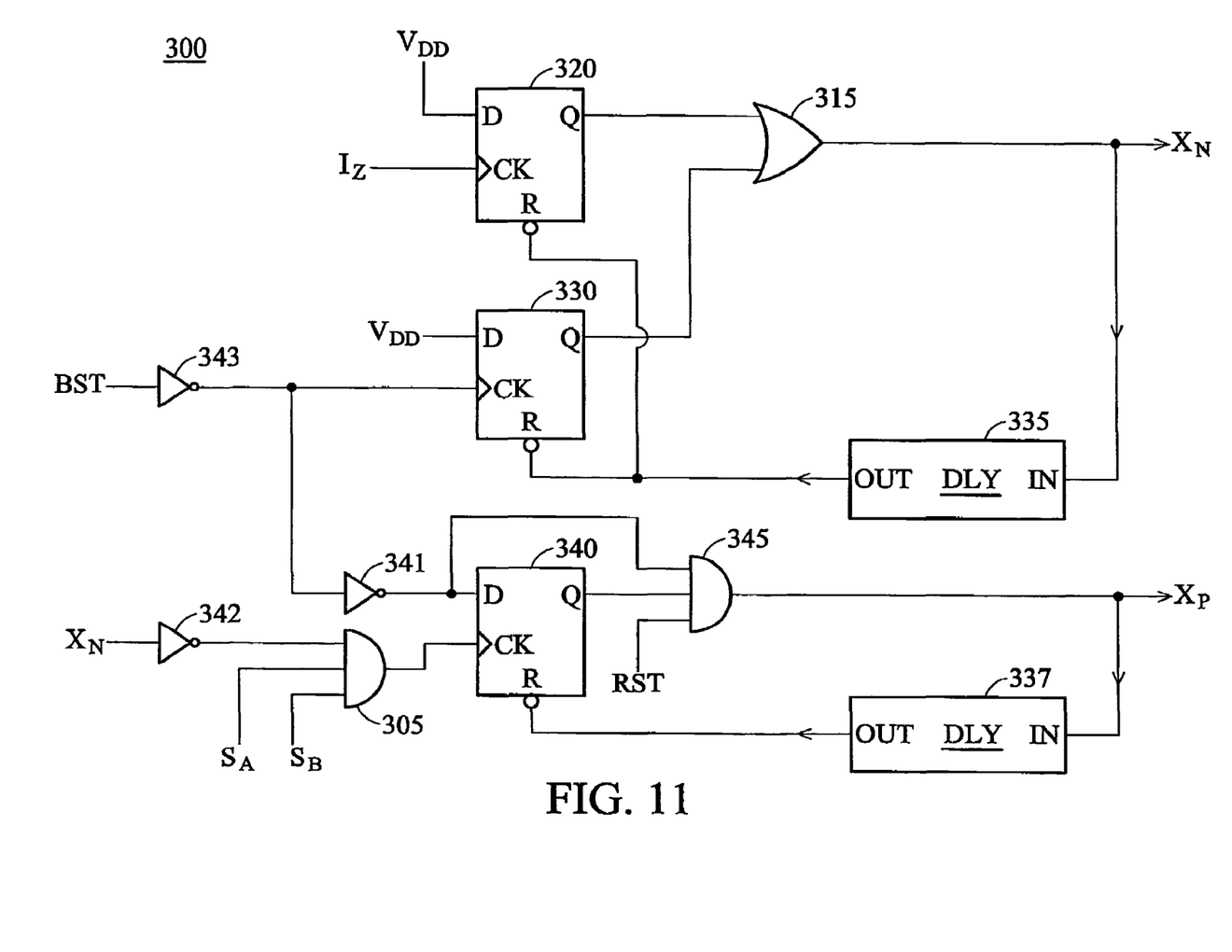
FIG. 11 is a preferred embodiment of a pulse-signal generator according to the present invention.

FIG. 11 is a schematic diagram of the pulse-signal generator 300. The clock-input of a flip-flop 320 is coupled to the zero-crossing signal $I_Z$ for generating a first signal. The first signal is connected to a first input of an OR gate 315. The burst signal BST is connected to drive the clock-input of a flip-flop 330 through an inverter 343. The flip-flop 330 outputs a second signal connected to a second input of the OR gate 315. The OR gate 315 is utilized to generate a negative-pulse signal at the second output-signal terminal $X_N$. The negative-pulse signal is coupled to reset flip-flops 320 and 330 through a delay circuit (DLY) 335. The delay time of the delay circuit 335 determines the pulse width $T_P$ of the negative-pulse signal. The output of the inverter 343 is coupled to the D-input of a flip-flop 340 and a first input of an AND gate 345 through an inverter 341. The clock-input of the flip-flop 340 is coupled to the output of an AND gate 305. The inputs of the AND gate 305 is connected to drive signals $S_A$, $S_B$. Another input of the AND gate 305 is further coupled to the second output-signal terminal $X_N$ through an inverter 342 to receive the negative-pulse signal. The output of the flip-flop 340 is connected to a second input of the AND gate 345. The power-on reset signal RST is coupled to a third input of the AND gate 345. The AND gate 345 is utilized to generate a positive-pulse signal at the first output-signal terminal $X_P$. The positive-pulse signal is coupled to reset the flip-flop 340 via a delay circuit 337. The delay time of the delay circuit 337 determines the pulse width $T_P$ of the positive-pulse signal. The pulse signal is therefore developed by the positive-pulse signal and the negative-pulse signal on the first output-signal terminal $X_P$ and the second output-signal terminal $X_N$.

Figure 12:
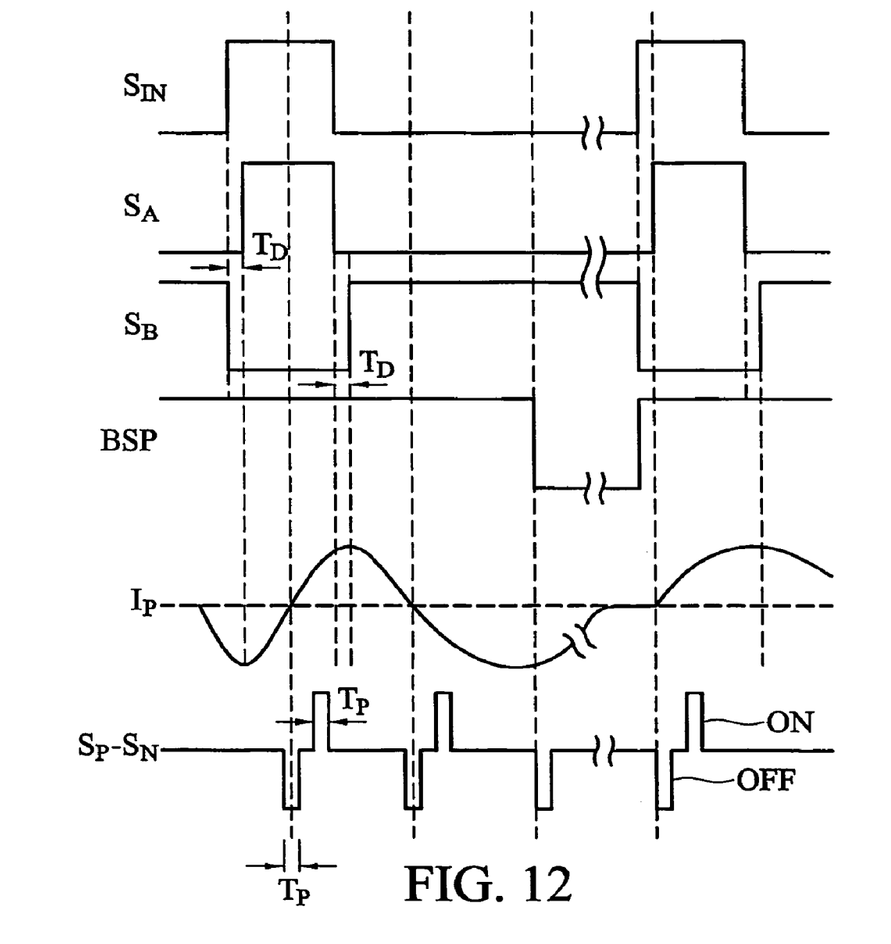
FIG. 12 shows signal waveforms of the synchronous rectifying circuit according to an embodiment of the present invention.

FIG. 12 shows signal waveforms of the synchronous rectifying circuit. The drive signals $S_A$ and $S_B$ are respectively generated in response the rising edge and the falling edge of the switching signal $S_{IN}$. A time delay is developed between the enabling of the switching signal $S_{IN}$ and the enabling of the drive signals $S_A$ and $S_B$. The delay time $T_D$ is designed in between the rising edge of the switching signal $S_{IN}$ and the rising edge of the drive signal $S_A$. Besides, another delay time $T_D$ is designed between the falling edge of the switching signal $S_{IN}$ and the rising edge of the drive signal $S_B$. The drive signal $S_B$ is the inversion of the drive signal $S_A$. A pulse signal $S_P$-$S_N$ (negative pulse signal) is generated in response to the zero-crossing signal $I_Z$ to disable the integrated synchronous rectifier 51 and 52. Following the end of the negative pulse signal, a pulse signal $S_P$-$S_N$ (positive pulse signal) is generated to enable integrated synchronous rectifier 51 or 52 if the diode 450 of the integrated synchronous rectifier 51 or 52 is conducted. Furthermore, the additional pulse signal $S_P$-$S_N$ (negative pulse signal) is generated in response to the burst signal BST. It means the integrated synchronous rectifier 51 and 52 will be disabled when the power converter is operated in the burst period of the burst mode.

Figure 13:
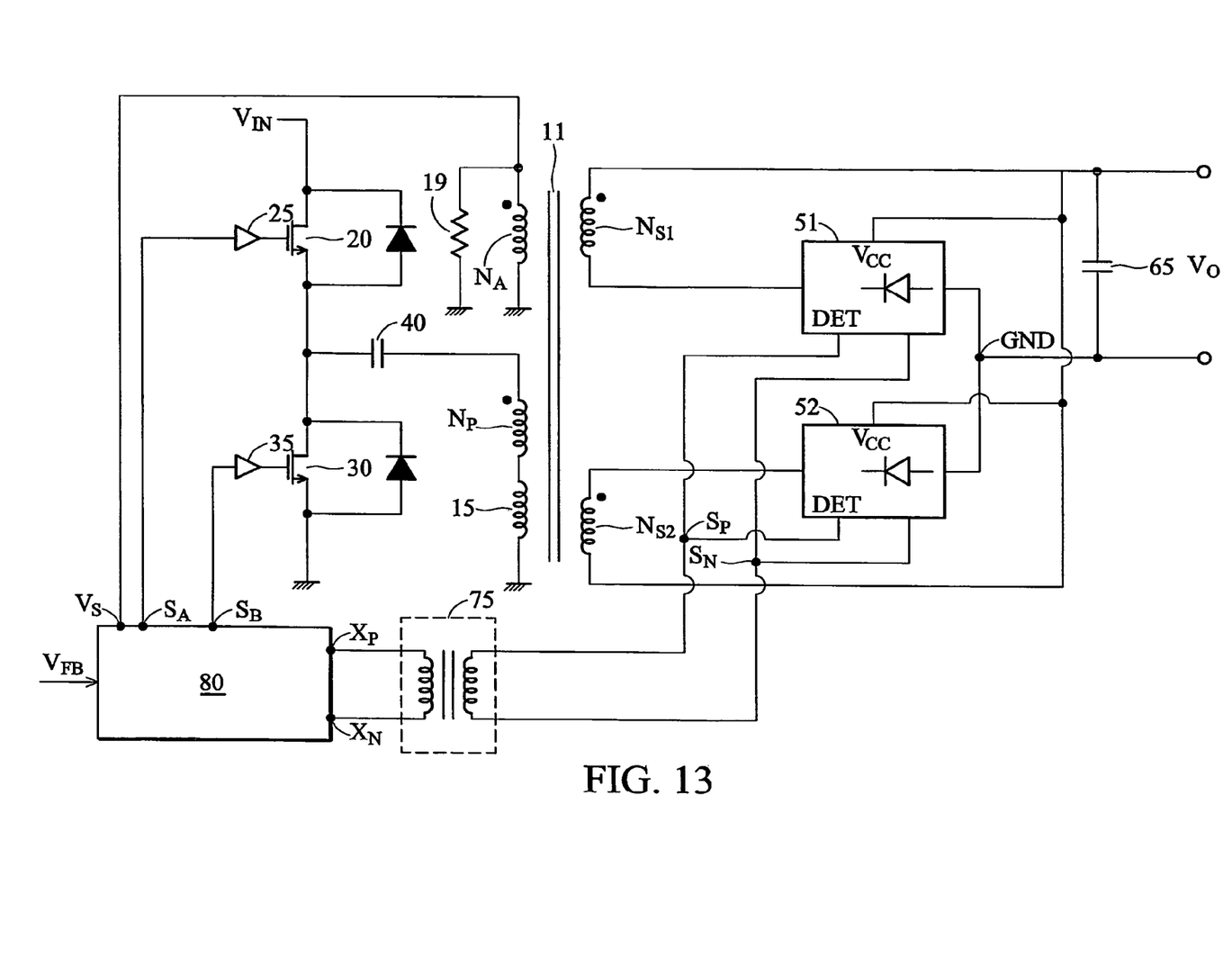
FIG. 13 shows another preferred embodiment of a soft switching power converter with synchronous rectifier according to the present invention.

FIG. 13 shows another preferred embodiment of soft switching power converter with the synchronous rectifying in accordance with the present invention. A pulse transformer 75 is used as the isolation device 70. In addition, a transformer 11 including an auxiliary winding $N_A$ coupled to a resistor 19 to generate the current signal $V_S$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An apparatus for synchronous rectifying of a soft switching power converter, comprising:
   an integrated synchronous rectifier comprising:
      a power transistor coupled between a transformer and the output of the soft switching power converter; and
      a controller receiving a pulse signal to switch on/off the power transistor;
   a switching control circuit generating the pulse signal in response to a current signal, and generating drive signals to switch the transformer in response to a switching signal; and
   an isolation device coupled to transfer the pulse signal between the switching control circuit and the integrated synchronous rectifier, wherein the switching signal is used for regulating the power converter and the current signal is correlated to the switching current of the transformer.

2. The apparatus as claimed in claim 1, further comprising a current sense device coupled to the transformer to generate the current signal in accordance with the switching current, wherein the pulse signal is generated in response to the current signal and zero-crossings of the switching current.

3. The apparatus as claimed in claim 1, wherein the controller of the integrated synchronous rectifier comprises a latch circuit coupled to turn on/off the power transistor, and the latch circuit is set or reset by the pulse signal.

4. The apparatus as claimed in claim 1, wherein the pulse signal is a differential signal, and on/off status of the integrated synchronous rectifier is determined according to a polarity of the pulse signal.

5. The apparatus as claimed in claim 1, wherein the integrated synchronous rectifier further comprises a maximum-on-time circuit to limit a maximum on time of the power transistor.

6. The apparatus as claimed in claim 1, wherein the isolation device is a pulse transformer or capacitors.

7. The apparatus as claimed in claim 1, wherein the switching control circuit further comprises a power management circuit for generating a burst signal in response to a feedback signal of the power converter, the burst signal is coupled to generate the pulse signal to switch off the power transistor, and the feedback signal is generated in accordance with the output load of the power converter.

8. The apparatus as claimed in claim 1, wherein a propagation delay is developed between drive signals for achieving soft switching of the power converter.

9. The apparatus as claimed in claim 1, wherein the switching control circuit further comprises a divide-by-two circuit to produce the switching signal having 50 percent duty cycle.

10. A method for controlling synchronous rectifying of a soft switching power converter, comprising:
    generating a pulse signal in response to a current signal;
    transferring the pulse signal through an isolation barrier;
    setting or resetting a latch in response to the pulse signal; and
    turning on/off a power transistor in accordance with a status of the latch, wherein the power transistor is coupled to a secondary side of a transformer for the rectifying; the current signal is generated in accordance with a switching current of the transformer.

11. The method as claimed in claim 10, wherein the pulse signal is generated in response to zero-crossings of the switching current of the transformer.

12. The method as claimed in claim 10, wherein the current signal is generated in response to a primary-side switching current of the transformer.

13. The method as claimed in claim 10, further comprising generating the pulse signal to turn off the power transistor in response to a burst signal, wherein the burst signal is generated in response to a feedback signal of the power converter, and the feedback signal is generated in accordance with the output load of the power converter.

14. The method as claimed in claim 10, wherein the maximum on time of the power transistor is limited by a maximum-on-time circuit.

15. The method as claimed in claim 10, wherein capacitors or pulse transformer are operated as an isolation device coupled to the isolation barrier.

* * * * *